UNITED STATES PATENT OFFICE.

STANLEY ORR, OF TARPON SPRINGS, FLORIDA.

ROTARY SHAFT OR ROD PACKING.

1,167,210.  Specification of Letters Patent.  Patented Jan. 4, 1916.

Application filed January 13, 1915. Serial No. 2,033.

*To all whom it may concern:*

Be it known that I, STANLEY ORR, a citizen of the United States, residing at Tarpon Springs, in the county of Hillsboro and State of Florida, have invented new and useful Improvements in Rotary Shaft or Rod Packing, of which the following is a specification.

This invention relates to certain new and useful improvements in packing for rotary rods or shafts, such as for the rotary shafts of centrifugal and other pumps, propeller shafts, and all other shafts requiring an air or water tight seal.

Heretofore, it has been the general custom to pack rotary shafts by the use of a stuffing box, including an adjustable gland or follower, together with outer friction rings of hard metal and an intermediate packing layer of flax, hemp or similar material. This style of packing is unsatisfactory, as it leaks and requires constant adjustment of the gland to keep it reasonably efficient, and besides it must be packed with comparatively expensive material and renewed at still greater cost at more or less frequent periods. Furthermore, such style of packing causes great wear upon the rod or shaft which in course of time must be replaced on this account at additional expense.

The primary object of my invention is to provide an efficient type of packing which revolves with the shaft or rod and thus operates without causing any wear thereon.

A further object of the invention is to provide a packing which dispenses with the use of costly packing materials, which will last for a comparatively long period, and which when worn may be replaced without any material inconvenience or trouble and at small expense.

A still further object of the invention is to provide a packing which is self adjusted to conform to variations in the shaft due to the shaft being out of alinement.

The invention consists of the features of construction, combination and arrangement of parts herein fully described and claimed, reference being had to the accompanying drawings in which:—

Figure 1:
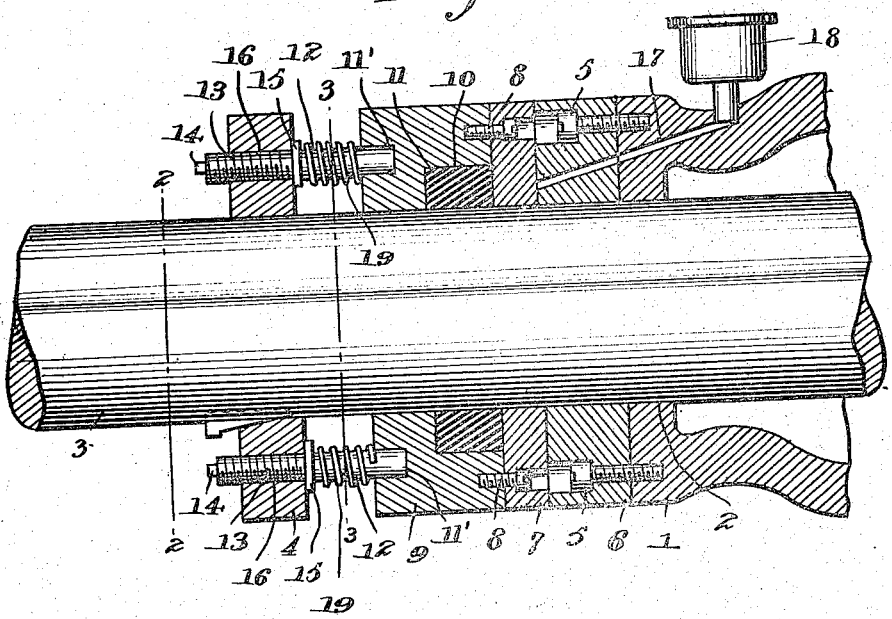
Figure 3:
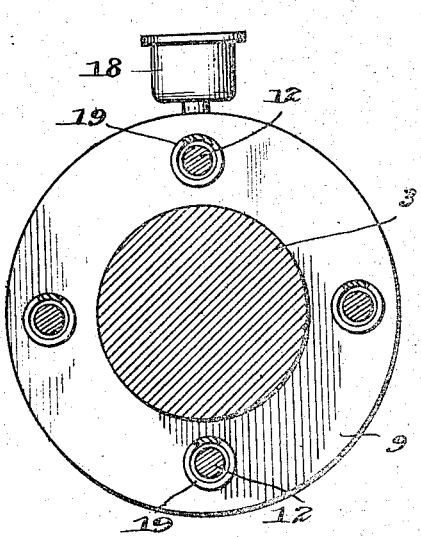
Figure 2:
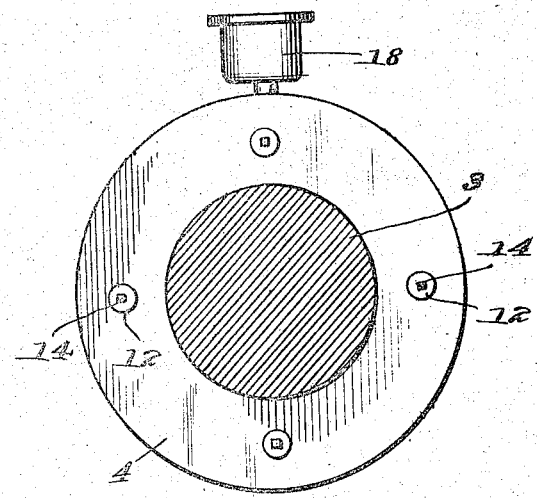

Figure 1 is a vertical longitudinal section showing the packing as it appears when applied to a determined structure, such as a pump casing. Fig. 2 is a vertical transverse section on the line 2—2 of Fig. 1. Fig. 3 is a vertical transverse section on the line 3—3 of Fig. 1.

Referring to the drawing, 1 designates a casing, which may be a pump casing, the stern of a boat provided with the invention, or any structure through which a rotary rod or shaft extends and which must be packed or sealed to prevent the passage of air, water or other fluid. The said casing 1 is provided with an opening 2 for the passage of the rotary shaft 3, to which is keyed or otherwise fixed, exteriorly of the casing, a shoulder ring or head ring 4, made of any suitable metal or material of the required strength and durability.

Secured to the casing 1, by means of countersunk screws or fastenings 5 is an inner packing ring 6 of some comparatively hard packing metal.

This ring is preferably made of brass, as this metal is sufficiently hard and durable, but not hard enough to cause considerable wear upon the rotating shaft 3. A second packing ring 7 is arranged in contact with the ring 6 and is preferably formed of a base or soft metal, such as Babbitt metal. This ring 7 is secured by countersunk screws 8 to a third ring 9 which is provided in its side adjacent the disk 7 with an annular recess 10 in which is disposed an elastic packing gasket 11, preferably formed of rubber. The outer face of the ring 9 is formed with sockets 11 to receive the circular ends of screws 12 which are provided with threaded portions 13 and angular ends 14, and also with shoulders 15. The shoulders 15 are engaged by the collar or head ring 4 and the threaded portions 13 of the screws 12 extend through and are arranged to work within threaded openings 16 in said collar or head, so that by turning the screws, in which action the inner end thereof rotates within the sockets 11, the ring 9 may be adjusted longitudinally of the shaft to force the gasket 11 against the disk 7, and be simultaneously crowded against the shaft 3, by which a tight seal may at all times be obtained.

The rings 7 and 9 are fastened together and are adjustable as a unit, so that the ring 7 may at all times revolve in contact with the face of the ring 6. The casing 1 and ring 6 are formed with a feed bore 17 communicating with a lubricant cup or receptacle 18, by means of which the faces of the rings 6 and 7 may be kept constantly lubricated. Helical pressure springs 19 inclose the screws 12 between the heads 15 and the ring 9 and normally press said ring 7 inwardly to maintain a close contact between rings 6 and 7, as will be readily understood. As the head 4 is keyed to the shaft and the ring 9 is coupled by the screws to rotate with said head, it will be evident that the packing unit composed of the parts 7, 9 and 11 will rotate with the shaft, while maintaining bearing contact with the ring 6, thus maintaining an absolutely tight joint. By means of the screws 12, which may be turned up whenever required, the rings 7 and 9 and gasket 11 may be adjusted to take up all wear, while at the same time such adjustment of the screws will tension the springs 19, thereby maintaining the surfaces of the rings 6 and 7 in close contact. By this means an absolutely tight seal against air, water and other liquids and fluids may be maintained, and a packing structure provided which will last for a long period and, being free from expensive elements, may be renewed when required without material cost.

It will be observed that the elastic gasket adapts the packing to assume a more or less angular position with relation to the shaft without decreasing the efficiency of the packing, to compensate for conditions in which the shaft is out of alinement. If desired, the two rings 6 and 7 may be made of dove-tailed sections, or otherwise sectionally constructed, so that they may be applied and removed without interfering with the shaft or other parts of the packing, while the construction described provides for the convenient renewal of the elastic gasket whenever necessary.

It will be evident that the structure described provides a packing which will subserve the aforementioned purposes without material wear upon the shaft, thus obtaining efficiency at a comparatively low cost for maintenance and repairs.

I claim:—

1. A rotary shaft packing comprising a casing, a rotary shaft, a packing ring of medium hard metal secured to the casing and surrounding the shaft, a carrier ring slidably mounted on the shaft, a soft metal packing ring secured to said carrier ring and lying in contact with the first-named ring, an elastic packing seated in the carrier ring and engaging the shaft, and means for connecting the carrier ring for rotation with the shaft, adjusting said ring longitudinally of the shaft and yieldingly pressing said carrier ring toward said packing ring.

2. In a shaft packing, the combination of a casing, a rotary shaft, a packing ring of medium hard metal secured to the casing and inclosing the shaft, a carrier ring inclosing the shaft, a head fixed to the shaft, adjusting screws engaging the head and journaled in the carrier ring, an elastic gasket seated in the carrier ring and engaging the shaft, a soft metal packing ring secured to the carrier ring and lying in contact with the first-named ring, and coiled springs surrounding the screws and exerting pressure on the carrier ring and adapted to be tensioned by the screws.

In testimony whereof I affix my signature in presence of two witnesses.

STANLEY ORR.

Witnesses:
J. R. DURRANCE,
J. R. WEST, Jr.